7919X
I. BREWSTER.
CHURN.
Patented Dec. 31, 1833.
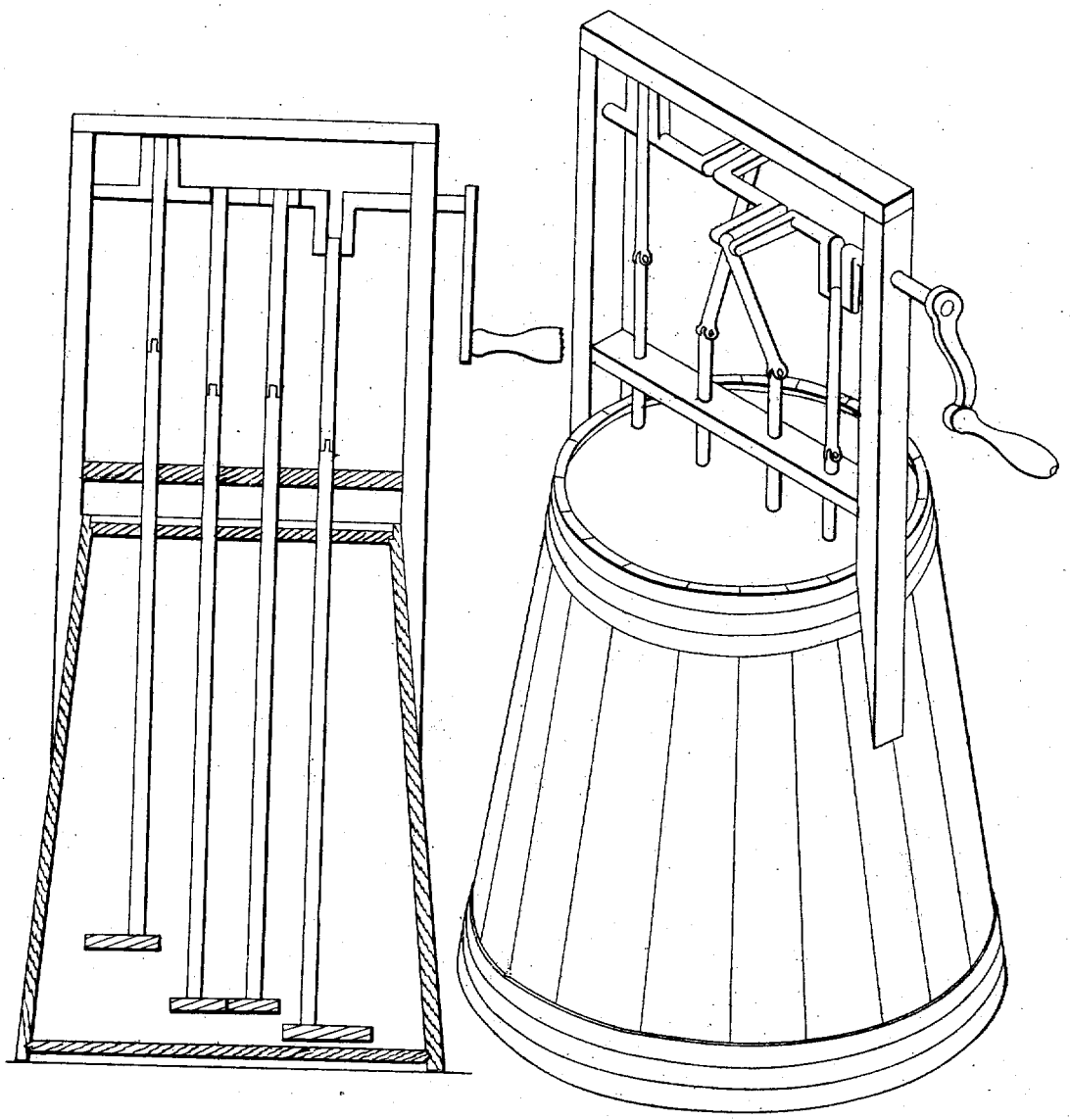
THE NORRIS PETERS CO., PHOTO-LITHO., WASHINGTON, D. C.

Dec 31, 1833 [illegible]

Iram Brewster Schoharie N.Y. 7919X

Letters Patent

The schedule referred to in these Letters Patent and making part of the same Containing a description in the words of the said Iram Brewster himself of his improvement in the Churn To all to whom these presents shall Come: ........

Be it known that I Iram Brewster of Blenheim in the County of Schoharie and State of New York have invented a new and useful improvement in the Churn and that the following is a full and exact description of the Construction and operation of the said machine as invented or improved by me viz.

A common round Churn body is to be used to the top of which is affixed an oblong square frame two feet ten inches long and the width to suit the diameter of the Churn top the lower cross piece of the frame to be three inches above the top of the Churn. A fourfold crank bent at right angles with a sweep of three inches placed near the top of the frame and turned within it by means of a crank on the outside of the frame. to each of the four angles of the crank within the frame is fasten-ed pitmans fifteen inches long the lower ends of which are also fastened by a joint to shafts or dashers which pass through the lower cross piece of the frame and lid of the Churn and may be round or square. — By turning the crank the four shafts or dashers are put in constant alternate motion. ..

In Witness whereof I have hereunto subscribed my name this 17 day of December 1833

Iram Brewster

Witnesses
R. [illegible]
Hiram [illegible]

330 [illegible]

Drawing

Ex.[illegible]
Chf[illegible]